Figure 1:
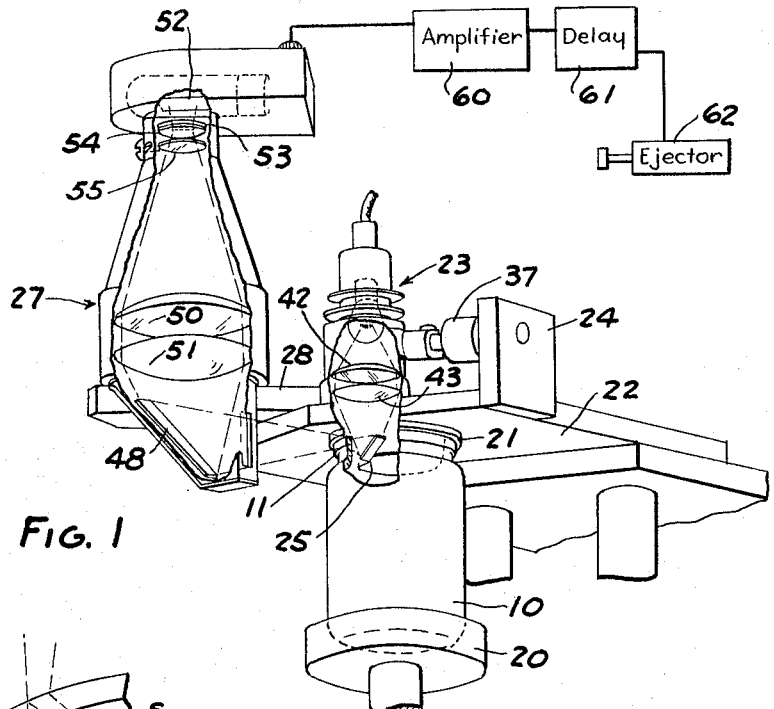

INVENTOR.
BENNY B. MATHIAS
BY
ATTORNEYS

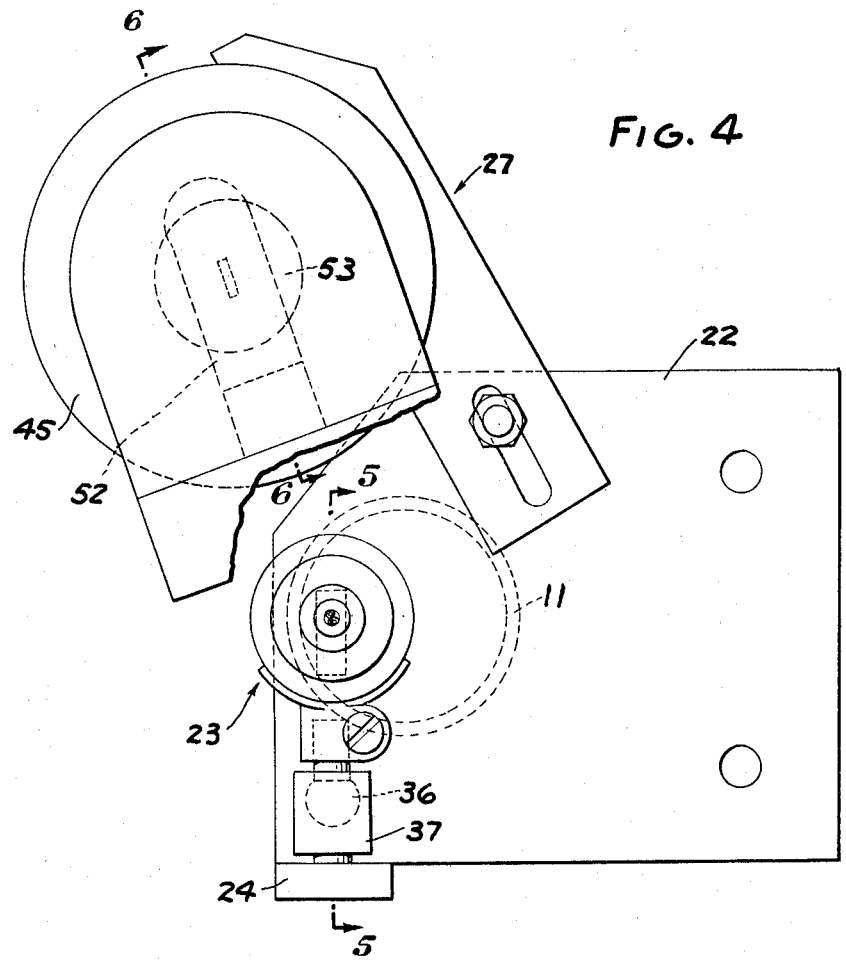

Aug. 23, 1966   B. B. MATHIAS   3,267,796
INSPECTING RIMS OF OPEN MOUTH CONTAINERS
Original Filed May 29, 1959   3 Sheets-Sheet 3
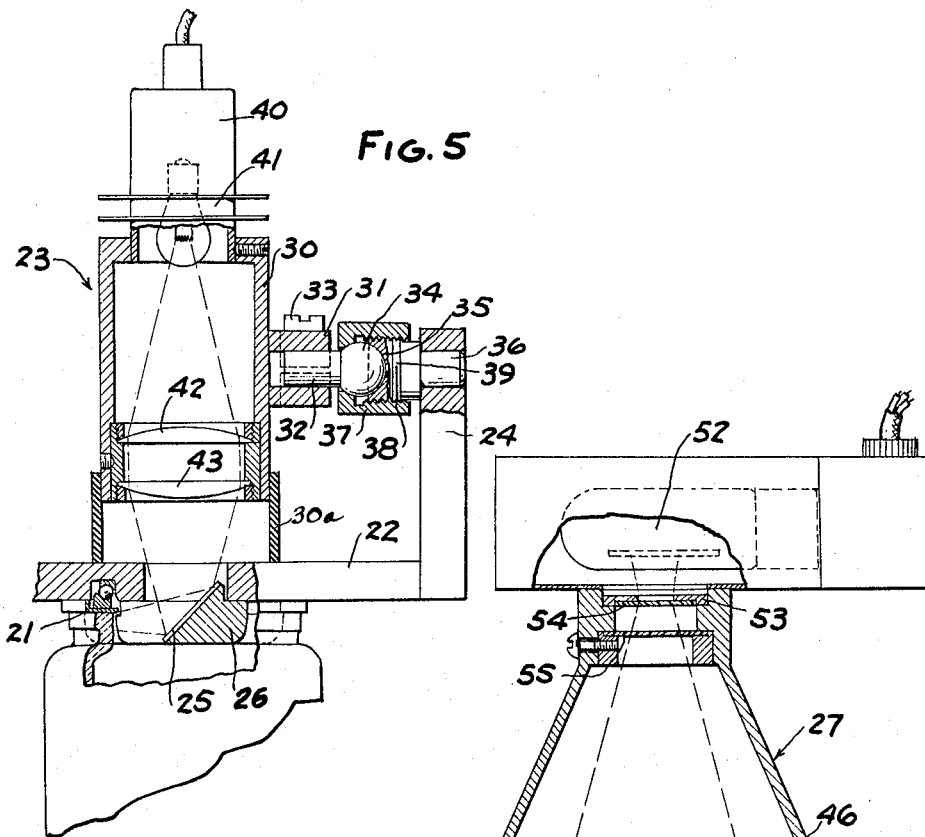
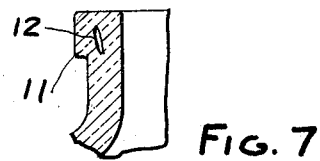
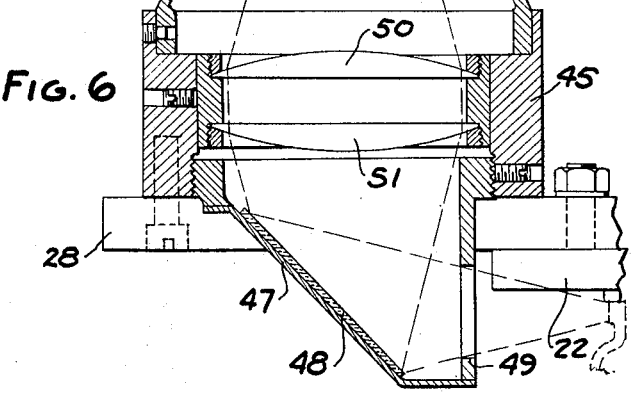
INVENTOR.
BENNY B. MATHIAS
BY W. A. Schaich &
E. J. Holler
ATTORNEYS

# United States Patent Office 3,267,796
Patented August 23, 1966

3,267,796
INSPECTING RIMS OF OPEN MOUTH CONTAINERS
Benny B. Mathias, Maumee, Ohio, assignor to Owens-Illinois Glass Company, a corporation of Ohio
Continuation of application Ser. No. 317,871, Oct. 18, 1963, which is a continuation of application Ser. No. 816,765, May 29, 1959. This application Dec. 24, 1964, Ser. No. 423,637
7 Claims. (Cl. 88—14)

This application is a continuation of my co-pending application Serial Number 317,871, filed October 18, 1963, now abandoned, which in turn was a continuation of my co-pending application Serial Number 816,765, filed May 29, 1959 (now abandoned).

This invention relates to inspecting the rims of open mouth containers and particularly to a method and apparatus for inspecting the rims of open mouth glass containers in order to detect flaws therein commonly known as line over finish defects.

In the manufacture of containers of glass or similar materials, one type of defect which is commonly encountered is known as a line over finish defect. Specifically, when a gob or parison of glass is pressed or blown to form an open mouth container, small blisters in the glass tend to become distorted and elongated. When such blisters are present in the rim or finish of an open mouth container, they extend generally axially of the container in the form of generally cylindrical voids either in the rim wall or on the surface of the rim wall. In some instances, the voids extend over the upper edge of the rim wall. In any event, these defects tend to prevent a proper seal when a closure having a gasket or sealing material therein is applied to the container. Where the defect is on the surface of the rim, air may enter between the gasket material and the surface. Where the defect is below the surface, the defect may in due time open up and extend to the surface, thus forming a point of possible leakage of air past the gasket of the container. Obviously, a close inspection of the rims is essential in order that such containers can be detected and discarded.

It has been heretofore suggested that defects in the rim known as crizzles, which are mirror like defects extending in generally radial planes, can be detected by directing a light beam against the rim of the container at an acute angle and positioning a photocell with its line of vision at approximately right angles to the beam so that when a defect is present, light from the beam will be reflected to the photocell. Such a detecting apparatus is shown in the patent to Fedorchak et al., 2,682,802. Although such an apparatus will detect crizzles, it is ineffective in detecting line over finish defects because the nature of the line over finish defect differs substantially from that of a crizzle. Accordingly, it has been necessary to inspect the containers visually in order to detect line over finish defects. This has been generally accomplished by a plurality of workers. In addition to the human error involved, the cost of such an inspection is substantial and it is necessary to use quite a large number of workers in order to keep up with high production of present day glass container making machines.

It is therefore an object of this invention to provide a method and apparatus for quickly and easily inspecting the rims of open mouth containers for line over finish defects; and to provide such a method and apparatus which is reliable.

According to the invention, a beam of radiant energy to which the glass is transparent is directed against the rim of the container at an acute angle to a radial plane and is focused at a spot on the rim. The container is then rotated about its axis relative to the spot in order to cause the spot to successively scan portions of the rim. A light sensitive element such as a photocell is positioned with its line of vision forming an angle of 125 to 175 degrees with the direction of the beam toward the rim. When a line over finish defect is present, a portion of the beam is refracted and reflected by the defect to the light sensitive element. The signal created by the light sensitive element is amplified and caused to actuate a rejection mechanism.

Figure 3:
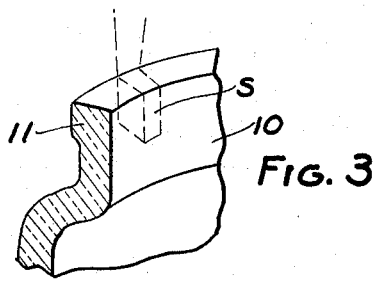
Figure 2:
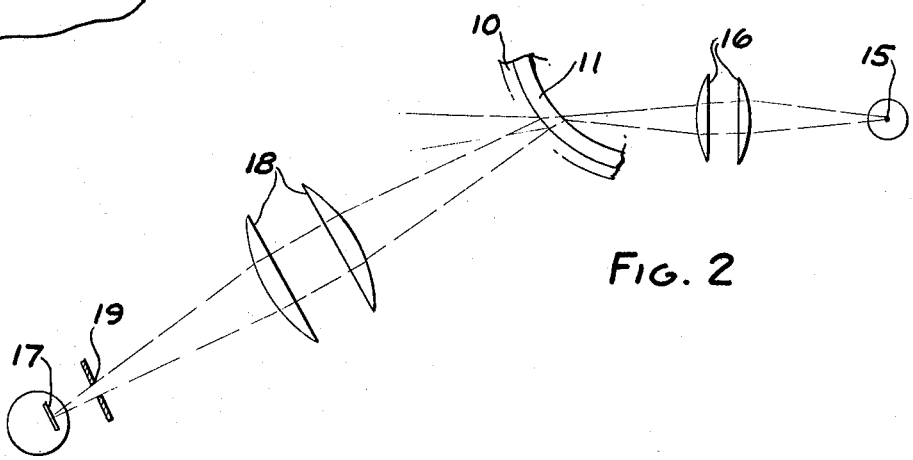

In the drawings:
FIG. 1 is a part sectional, partly diagrammatic perspective view of an apparatus embodying the invention.
FIG. 2 is a diagrammatic plan view showing the relationship of the various operating parts of the invention.
FIG. 3 is a fragmentary perspective view of a rim of a container which is being inspected.
FIG. 4 is a plan view of a portion of the apparatus shown in FIG. 1, parts being broken away.
FIG. 5 is a fragmentary sectional view taken along the line 5—5 in FIG. 4.
FIG. 6 is a fragmentary sectional view taken along the line 6—6 in FIG. 4.
FIGS. 7, 8, and 9 are vertical sections through the rim of glass containers showing various line over finish defects.

Referring to FIGS. 1 and 3, container 10 which is to be inspected is formed with a rim 11 which defines an open mouth or upper end and is herein shown as being generally cylindrical. The types of defects, known as the line over finish defects, which are to be detected are shown on an exaggerated scale in FIGS. 7, 8, and 9. In FIG. 7 the defect lies wholly within the body of the rim 11 and is in the form of a generally cylindrical void 12 formed by a blister which has been elongated in a direction generally parallel to the axis of the container. In FIG. 8 the defect 13 is formed in a similar manner and is on the outer surface of the rim. In FIG. 9 the defect 14 is on the outer surface and extends up over the upper edge of the rim 11.

The method of the invention may be readily understood by referring to FIG. 2 wherein the container 10 is shown in plan view. Light from a source 15 is directed against the inner surface of the rim 11 and focused on the wall, preferably on the interior of the wall by condensing lenses 16. Container 10 is rotated about its axis so that the spot of light successively scans portions of the rim 11. When a line over finish defect comes within the path of the light beam, a portion of the beam is refracted and reflected by the defect. Specifically, a portion of the beam is refracted by the passing through the surface of the cylindrical defect or void while a portion of the beam is reflected by the surface of the cylindrical defect. A light sensitive element 17 such as a photocell is positioned adjacent the exterior of the container 10 with its line of vision forming an angle ranging from 125° to 175° with the direction of the beam toward the rim 11. The portion of the light beam reflected and refracted by the defect is focused by lenses 18 into an image in a plane immediately adjacent the light sensitive element 17 and a mask 19 is provided adjacent the element 17 in order to limit the vision of the element to the area being scanned. By this arrangement, a line over finish defect will energize the light sensitive element 17.

A specific apparatus for detecting defects is shown in FIGS. 1, 4, 5, and 6 and comprises a support pad 20 which is adapted to be rotated about its axis and onto which containers 10 are moved in succession. The pad structure and the apparatus for moving the containers 10 onto the pad structure and removing the containers therefrom may be of the type shown in Fedorchak et al., 2,682,802.

Support pad 20 is adapted to be moved upwardly to bring the rim 11 of container 10 into contact with a head 21 rotatably mounted in a table 22. A light source assembly 23 mounted on a plate 24 on table 22 is adapted to direct a beam of light against a mirror 25 mounted in the head 26 and focus the beam of light in a spot S (FIG. 3) on the interior of the rim 11 of the article.

A photocell assembly 27 mounted on plate 28 mounted on table 22 adjacent the exterior of the container 10 is adapted to receive the light refracted and reflected from a line over finish defect, and refracted and reflected focus the light in an image adjacent a photoelectric cell.

Specifically referring to FIGS. 1 and 5, the light source assembly 23 comprises a generally cylindrical housing 30 which is mounted on plate 24 by a structure which includes a laterally extending tubular projection 31 in which a shaft 32 is fixed by a clamping screw 33. The outer end of shaft 32 is formed with a spherical portion 34 which engages a spherical surface 35 in a plug 36 mounted in plate 24. A collar 37 engages the spherical portion 34 and is formed with threads 38 engaging threads 39 on plug 36 to frictionally hold the shaft 32 and in turn the housing 30 in adjusted position on the plate 24. A lamp support 40 including an incandescent lamp 41 is mounted on the upper end of the housing 30 and directs a beam of light, to which the container is transparent, downwardly through the housing 30. Condensing lenses 42, 43 in the path of the light beam focus the light beam and direct it vertically downwardly onto the surface of flat mirror 25 which is positioned with its plane forming an angle of 45° with the axis of the beam. Mirror 25 is preferably of the type having the mirror surface on the exterior and in turn directs the beam against the inner surface of the rim 11 at an acute angle to a radial plane.

As shown in FIG. 6, the photocell assembly 27 comprises a housing including a lower cylindrical section 45 and an upper frusto-conical section 46. The lower cylindrical section 45 supports a mirror housing 47 in which a flat mirror 48 is positioned with its plane forming an angle of 45° with the axis of the vertical mirror 48 is preferably of the type having the mirror material on the exterior surface, is mounted. The mirror housing 47 includes an opening 49 through which light refracted and reflected from a line over finish defect is directed toward the mirror. A pair of condensing lenses 50, 51, are supported in the housing section 45 with their axes coincident with the axis of a photocell 52 mounted on the upper end of the housing section 46. An aperture plate 53 is positioned adjacent the photocell 52. In addition, polaroid filters 54, 55, are provided in order to control the amount of light to the photocell and thereby compensate for variations in the sensitivity between one photocell and another. The condensing lenses 50, 51 are adapted to focus the light in the plane of the aperture plate 53. The use of aperture plate 53 limits the area of vision of the photocell to the area being inspected and thereby improves the ratio of the amount of light which may be scattered and directed to the photocell from a finish without line over finish defect to the amount of light refracted and reflected from a line over finish defect to the photocell.

As shown in FIG. 5, incandescent lamp 41 preferably has a straight horizontal filament which produces a generally rectangular beam of light. The position of the bulb is adjusted so that the spot S is rectangular with its longest dimension extending generally parallel to the axis of the container as shown in FIG. 3. The aperture plate 53 also has a rectangular opening therein which is oriented so that the portion of the light being viewed by the photocell 52 corresponds to the portion of the rim 11 which is to be viewed.

In use, a container 10 is brought into position on the pad 20 and the pad 20 is moved upwardly, bringing the rim 11 into engagement with the head 21. Pad 20 is then rotated to cause the spot S of light to scan the rim. If a line over finish defect is present, light will be refracted and reflected by the defect toward the photocell. By using the condensing lenses 50, 51 the light which tends to be scattered by the cylindrical surfaces of the defect is collected and concentrated into an image adjacent the photocell so that the photocell can be actuated.

If a line over surface defect is present, the photocell will be energized. This signal is then amplified by an amplifier 60 and caused to actuate a delay mechanism 61. When the article 10 is removed from the pad 20 and moves along a different portion in its path, the ejector 62 is actuated by the delay mechanism to reject and discard the container 10.

It can thus be seen that I have provided a method and apparatus for quickly and easily detecting line over finish defects.

I claim:
1. The method of inspecting the rim of an open mouth container for line over finish defects comprising generally cylindrical voids in the rim extending generally axially of the container, which method comprises projecting a beam of radiation from a source of radiant energy, directing said beam against one side of the wall of the rim of a container while the container is empty, focusing said beam in a small spot on the interior of the rim of said container, said spot having a greater dimension in a direction parallel to the axis of the container, causing relative movement of the beam and the container about the axis of the container, positioning an element sensitive to the said radiation with its line of vision intersecting the other side of the wall of the rim of the container and forming an angle ranging from 125° to 175° with the path of the beam toward the wall of the rim of the container, causing a portion of the beam to be refracted and reflected by movement of a line over finish defect into the path of the beam, focusing said refracted and reflected beam portion adjacent said sensitive element, masking said refracted and reflected portion at the plane of focusing, thereby energizing said element, and creating a reject signal in response to energization of said element.

2. The method of inspecting the rim of an open mouth container for line over finish defects comprising generally cylindrical voids in the rim extending generally axially of the container, which method comprises projecting a beam of radiation from a source of radiant energy, directing said beam against one side of the wall of the rim of a container while the container is empty, focusing said beam in a small spot on the interior of the rim of said container, said spot having a greater dimension in a direction parallel to the axis of the container, causing relative movement of the beam and the container about the axis of the container, positioning an element sensitive to the said radiation with its line of vision forming an angle ranging from 125° to 175° with the path of the beam toward the wall of the rim of the container, causing a portion of the beam to be refracted and reflected by movement of a line over finish defect into the path of the beam, focusing said refracted and reflected portion adjacent said sensitive element, restricting the field of vision of the sensitive element to the area of the rim of the container onto which the beam is focused in a small spot, and creating a reject signal in response to energization of said element.

3. An apparatus for inspecting the rim of an open mouth container for line over finish defects comprising generally cylindrical voids in the rim extending generally axially of the container, said apparatus comprising a support for the container, a source of radiant energy mounted adjacent said container, means for focusing a beam of radiation from said source and directing the beam against one wall surface of the container to produce a rectangular spot of radiant energy on the rim of the container, the spot having a greater dimension in a direction parallel to the axis of the container, means for causing relative rotation between said spot and said container about the axis of the container, an element sensitive to said radiation mounted adjacent said container with its line of vision intersecting the opposite wall surface of the rim of the container and forming an angle ranging from 125° to 175° with the path of the beam being toward the rim of the container, means in the line of vision of the sensitive element for focusing the portion of the beam reflected and refracted by movement of the line over finish defect into the path of the spot of radiant energy, said means focusing said portion in a plane adjacent said sensitive element, masking means adjacent said sensitive element in the plane of focusing of said refracted and reflected portion of the beam, whereby said light sensitive element is energized by a line over finish defect, and means connected to said element for creating a reject signal in response to energization of said sensitive element.

4. An apparatus for inspecting the rim of an open mouth container for line over finish defects comprising generally cylindrical voids in the rim extending generally axially of the container, said apparatus comprising a support for the container, a source of radiant energy mounted adjacent said container, means for focusing a beam of radiation from said source and directing the beam against one wall surface of the container to produce a rectangular spot of radiant energy on the rim of the container, the spot having a greater dimension in a direction parallel to the axis of the container, means for causing relative rotation between said spot and said container about the axis of the container, an element sensitive to said radiation mounted adjacent said container with its line of vision intersecting the opposite wall surface of the rim of the container and forming an angle ranging from 125° to 175° with the path of the beam toward the rim of the container, means in the line of vision of the sensitive element for focusing the portion of the beam reflected and refracted by movement of the line over finish defect into the path of the spot of radiant energy, said means focusing said portion in a plane adjacent said sensitive element, means for restricting the field of vision of the sensitive element to the area of the rim of the container into which the rectangular spot of radiant energy is focused, and means connected to said element for creating a reject signal in response to energization of said sensitive element.

5. The method of inspecting the rim of an open mouth container for line over finish defects comprising generally cylindrical voids in the rim extending generally axially of the container, which method comprises projecting a beam of radiation from a source of radiant energy, directing said beam against one side of the wall of the rim of a container while the container is empty, focusing said beam in a small spot on the interior of the rim of said container, said spot having a greater dimension in a direction parallel to the axis of the container, causing relative movement of the beam and the container about the axis of the container, positioning an element sensitive to the said radiation with its line of vision forming an angle ranging from 125° to 175° with the path of the beam toward the wall of the rim of the container, causing a portion of the beam to be refracted and reflected by movement of a line over finish defect into the path of the beam, restricting the field of vision of the sensitive element to the area of the rim of the container onto which the beam is focused in a small spot, and creating a reject signal in response to energization of said element.

6. An apparatus for inspecting the rim of an open mouth container for line over finish defects comprising generally cylindrical voids in the rim extending generally axially of the container, said apparatus comprising a support for the container, a source of radiant energy mounted adjacent said container, means for focusing a beam of radiation from said source and directing the beam against one side of the wall of the rim and thereby producing a spot of radiation on the wall of the container which has a greater dimension in a direction parallel to the axis of the container, means for causing a relative rotation of said container and said spot about the axis of the container, an element mounted adjacent said container, said element being sensitive to said radiation, the line of vision of said sensitive element intersecting the other side of the wall of the rim of the container and forming an angle ranging from 125° to 175° with the beam of light directed against the wall of the rim of the container, whereby said sensitive element is energized whenever a line over finish defect in the rim refracts and reflects the portion of the beam, a mask positioned adjacent said light sensitive element and limiting the area of said refracted and reflected portion of the beam which is in the line of vision of said sensitive element, and means connected to said element for creating a reject signal in response to energization of said sensitive element.

7. An apparatus for inspecting the rim of an open mouth container for line over finish defects comprising generally cylindrical voids in the rim extending generally axially of the container, said apparatus comprising a support for the container, a source of radiant energy mounted adjacent said container, means for focusing a beam of radiation from said source and directing the beam against one side of the wall of the rim and thereby producing a spot of radiation on the wall of the container, means for causing a relative rotation of said container and said spot about the axis of the container, an element mounted adjacent said container, said element being sensitive to said radiation, the line of vision of said sensitive element intersecting the other side of the wall of the rim of the container and forming an angle ranging from 125° to 175° with the beam of light directed against the wall of the rim of the container, whereby said sensitive element is energized whenever a line over finish defect in the rim refracts and reflects the portion of the beam, means connected to said element for creating a reject signal in response to energization of said sensitive element, means for focusing the radiation reflected and refracted by a line over finish defect in a plane adjacent said light sensitive element, and a mask positioned adjacent said light sensitive element at the plane of focus of said refracted and reflected portion of the beam thereby limiting the area of said refracted and reflected portion of the beam which is in the line of vision of said sensitive element.

References Cited by the Examiner

UNITED STATES PATENTS

| 2,481,863 | 9/1949 | Owens | 209—111.7 X |
|---|---|---|---|
| 2,531,529 | 11/1950 | Price | 250—218 |
| 2,643,767 | 6/1953 | Baker | 88—14 X |
| 3,067,872 | 12/1962 | Fouse | 209—111.7 X |

M. HENSON WOOD, Jr., *Primary Examiner.*

ROBERT B. REEVES, *Examiner.*

R. A. SCHACHER, *Assistant Examiner.*